US006728477B1

(12) United States Patent
Watkins

(10) Patent No.: US 6,728,477 B1
(45) Date of Patent: Apr. 27, 2004

(54) SIMULTANEOUS MULTIPLE-ANGLE PRESENTATION OF DVD AUDIO/VISUAL CONTENT

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/473,382

(22) Filed: Dec. 28, 1999

(51) Int. Cl.[7] .................................................. H04N 5/781
(52) U.S. Cl. ...................................... 386/125; 386/126
(58) Field of Search ............................... 386/1, 46, 52, 386/35, 97, 117, 125; 345/719, 723, 781, 783, 845

(56) References Cited

U.S. PATENT DOCUMENTS 4,685,003 A * 8/1987 Westland .................... 386/52
6,028,979 A * 2/2000 Hirayama et al. ............ 386/95
6,335,742 B1 * 1/2002 Takemoto .................. 386/117
6,453,459 B1 * 9/2002 Brodersen et al. ........... 386/46
6,483,983 B1 * 11/2002 Takahashi et al. ............ 386/46

* cited by examiner

Primary Examiner—Thai Tran
Assistant Examiner—Christopher Onuaku
(74) Attorney, Agent, or Firm—John R. Ley, LLC

(57) ABSTRACT

A DVD player or computer with a DVD drive simultaneously presents multiple angles of video on a display. DVD standards provide for formatting and storing video that was filmed from more than one angle. Desired angles are selected, and the DVD player multiplexes between each angle of the playback to decode video frames for each selected angle. The frames for each angle being played back are filtered down to a size that fits into a fragment of the display. Each of the filtered frames are assembled into a single frame that can be presented on the display to simultaneously playback each angle.

23 Claims, 9 Drawing Sheets

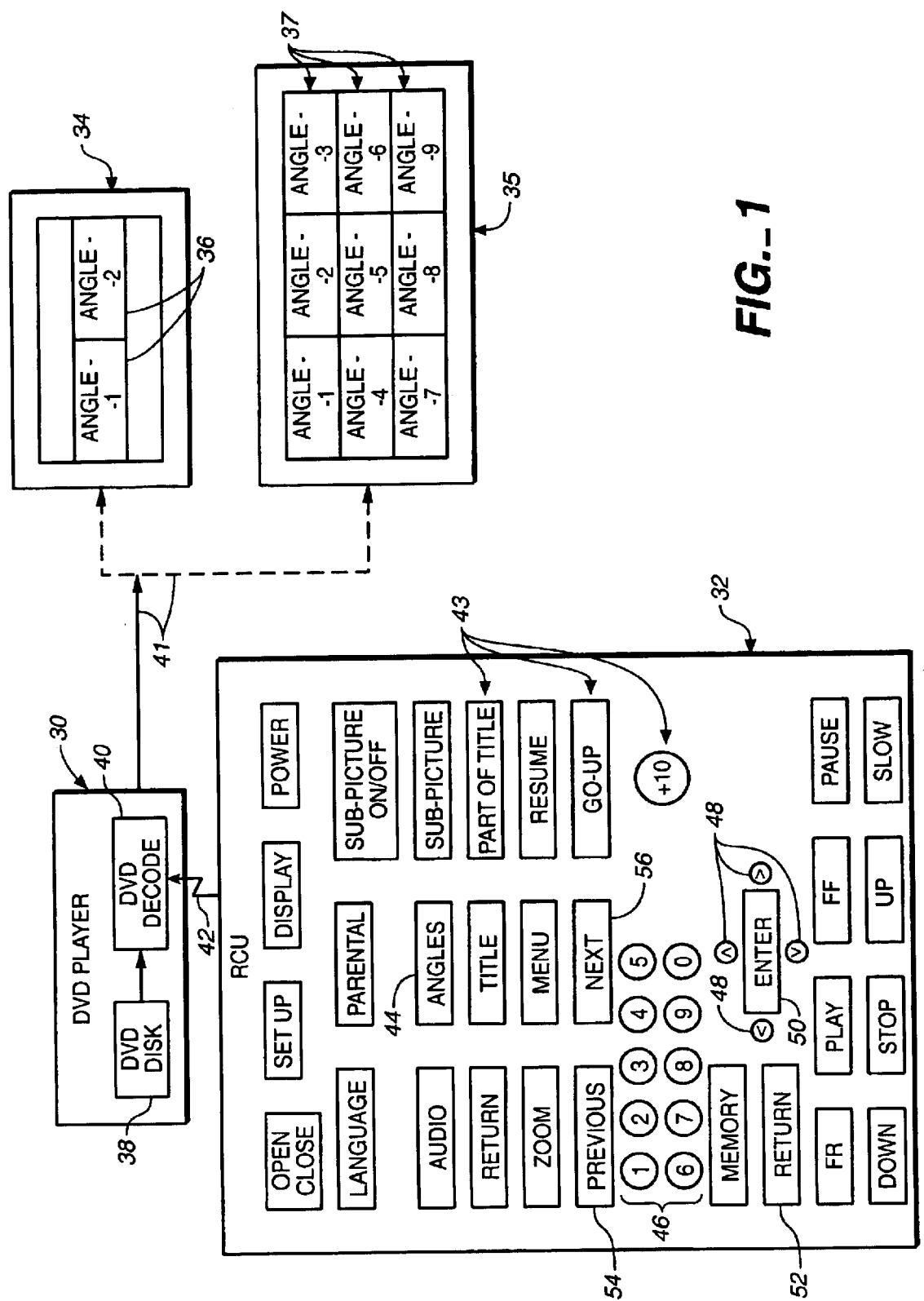
FIG._1

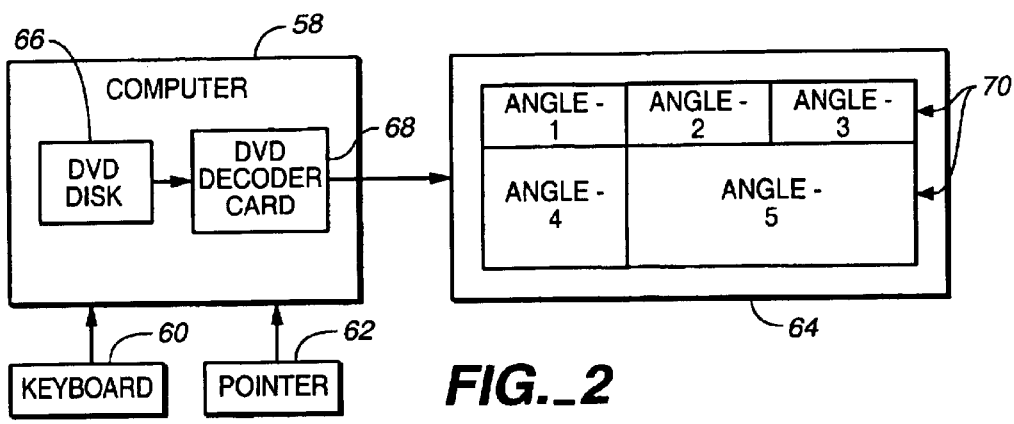
FIG._2
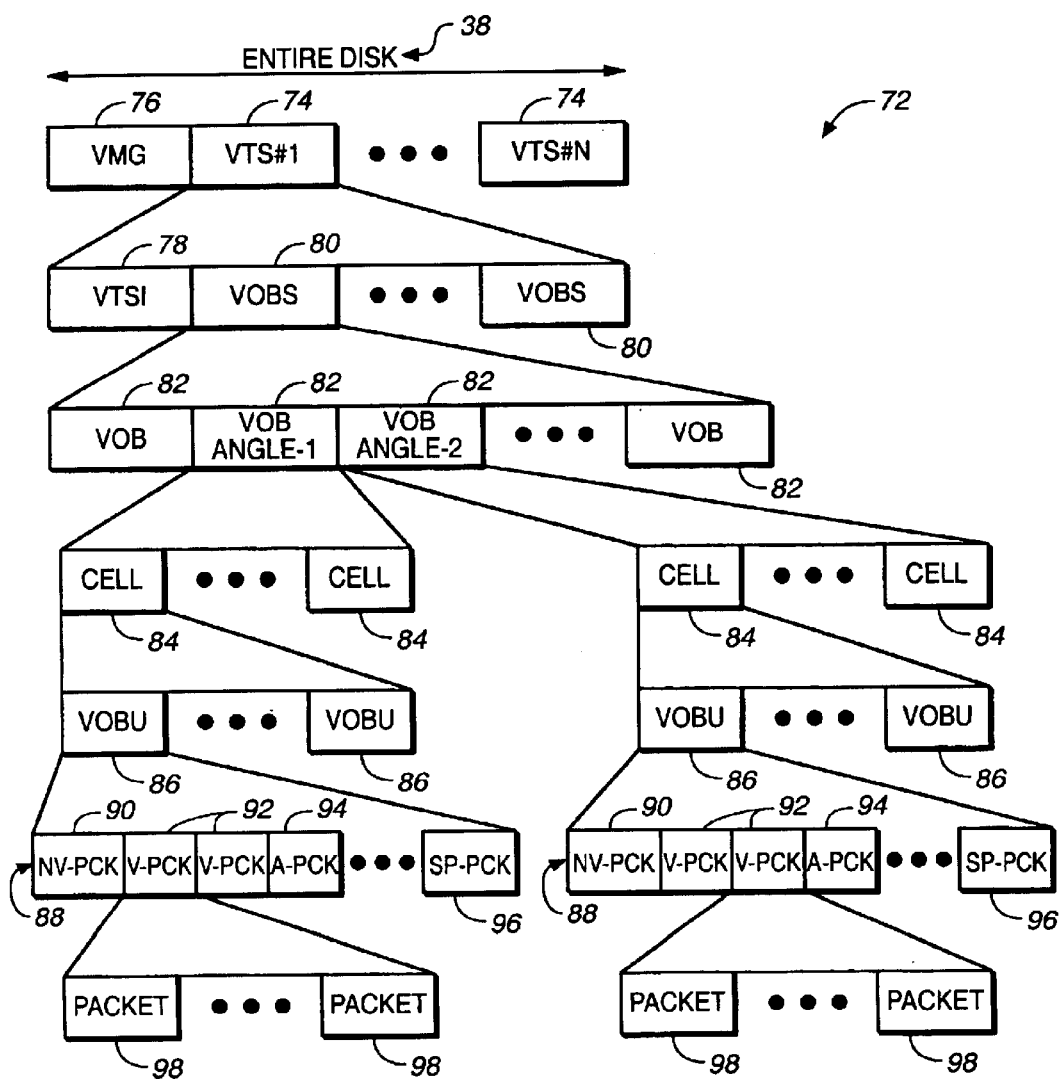
FIG._3

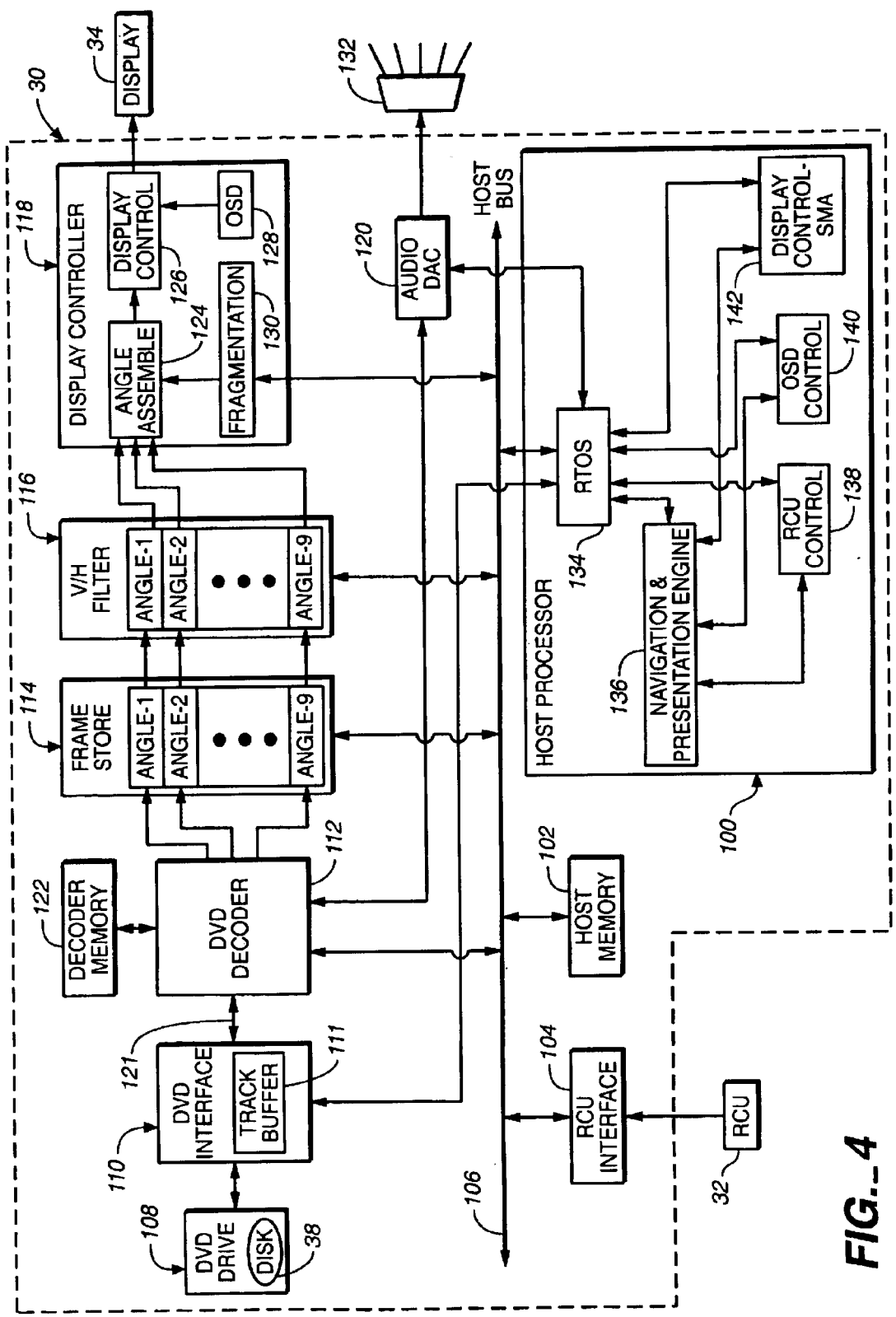
FIG._4

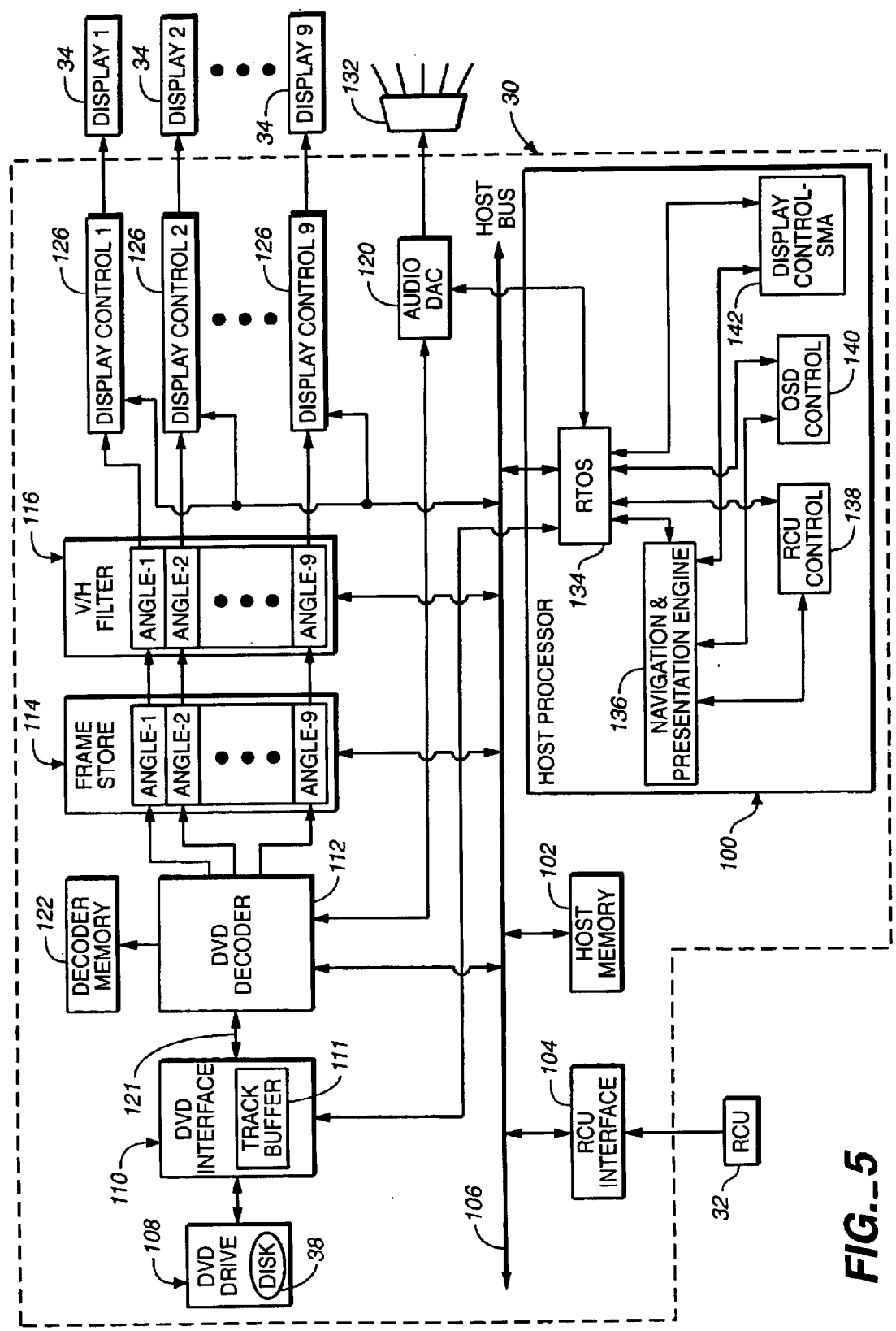
FIG._5

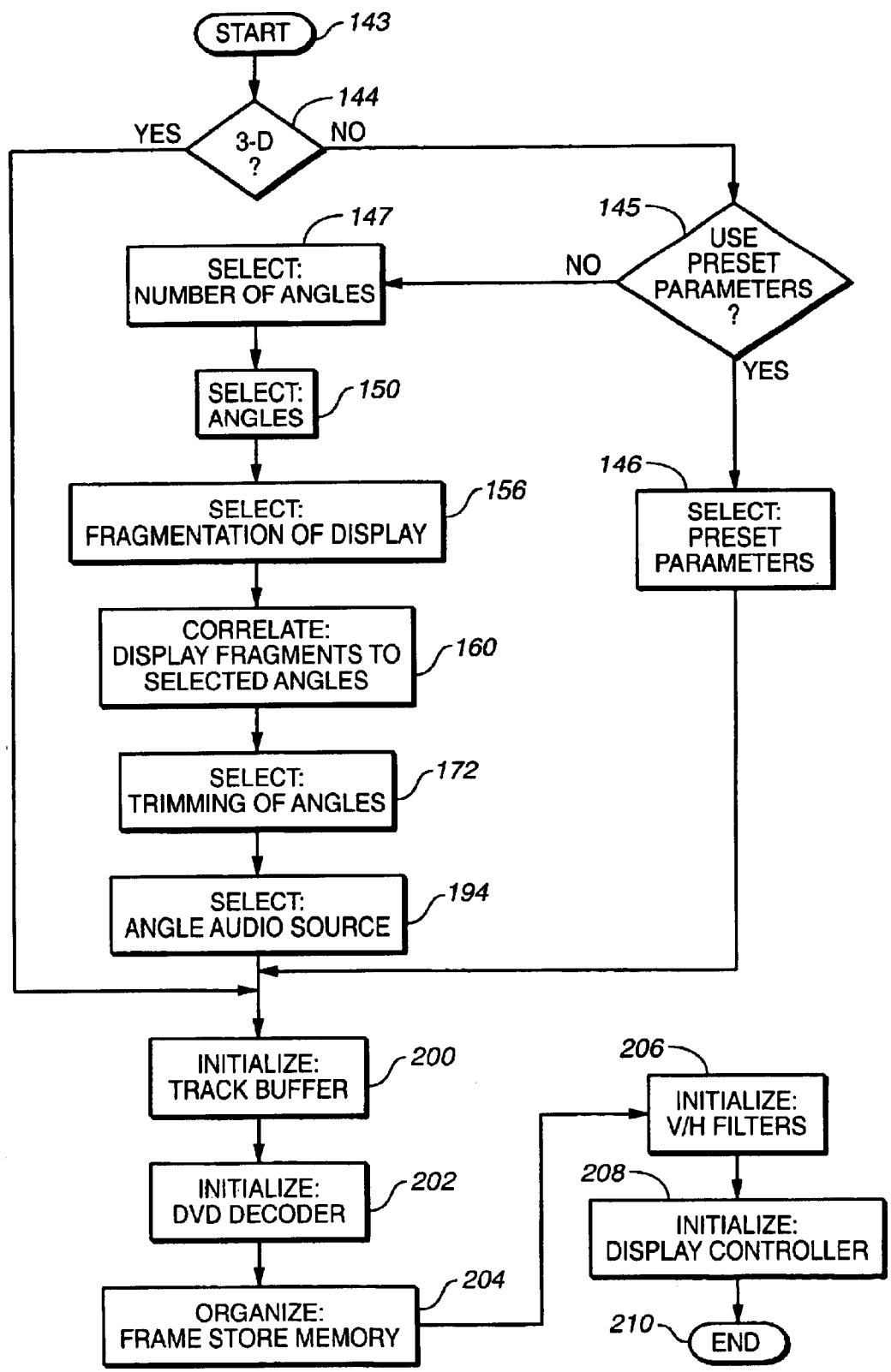
FIG._6

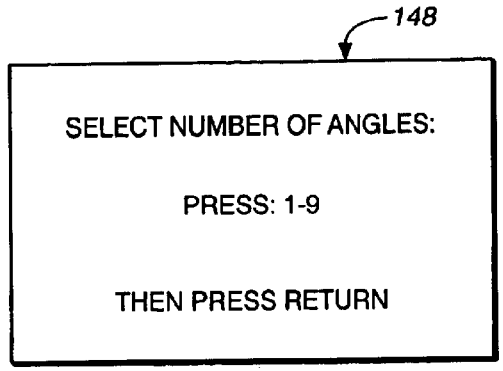
FIG._7
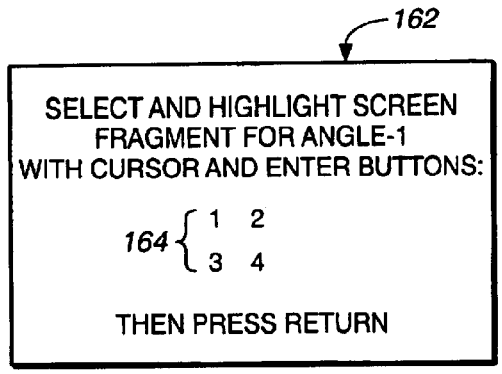
FIG._10
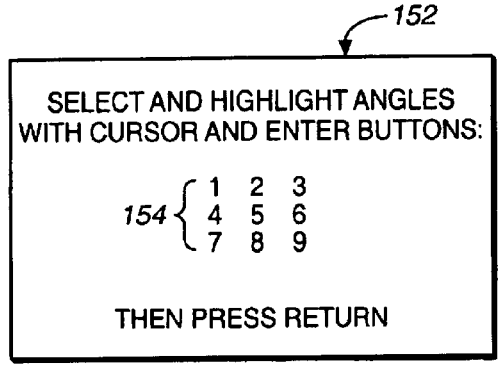
FIG._8
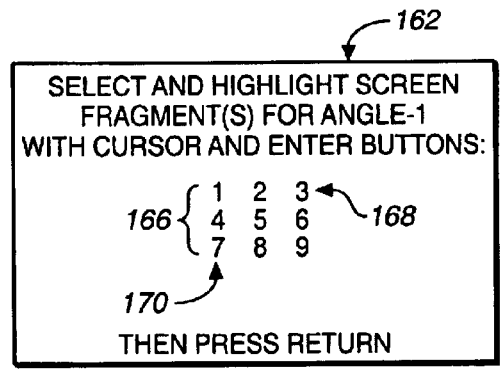
FIG._11
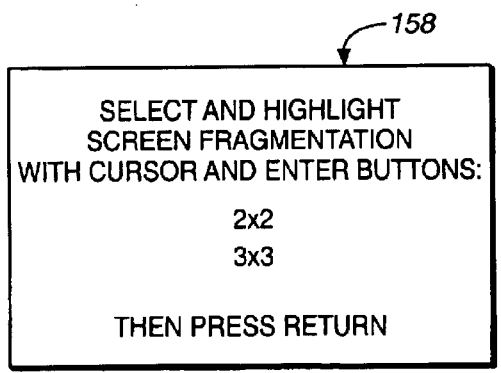
FIG._9

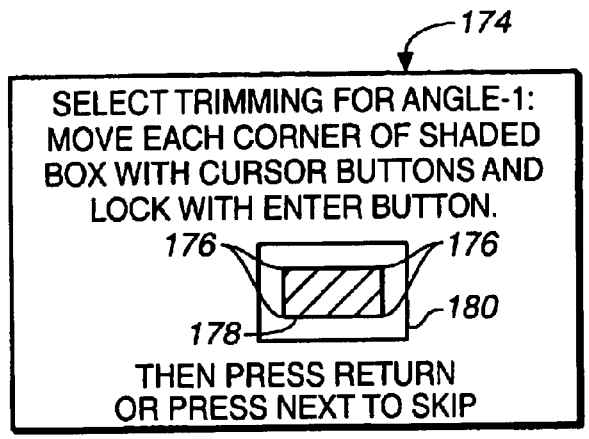
FIG._12
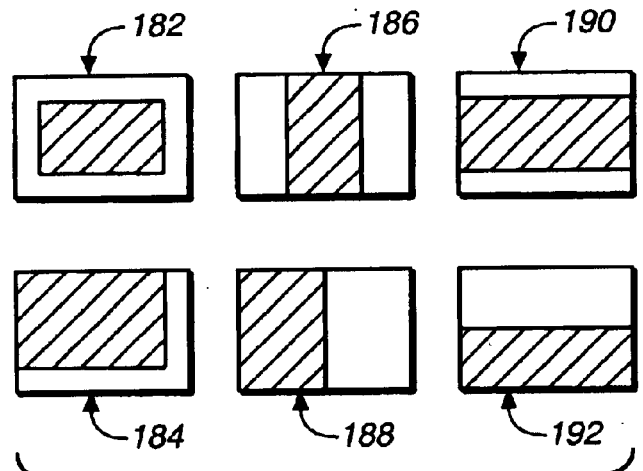
FIG._13
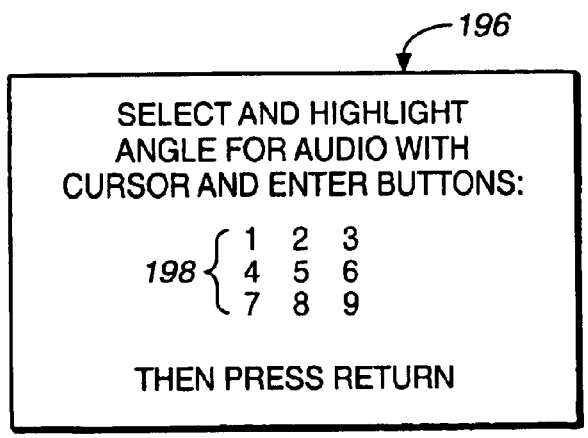
FIG._14

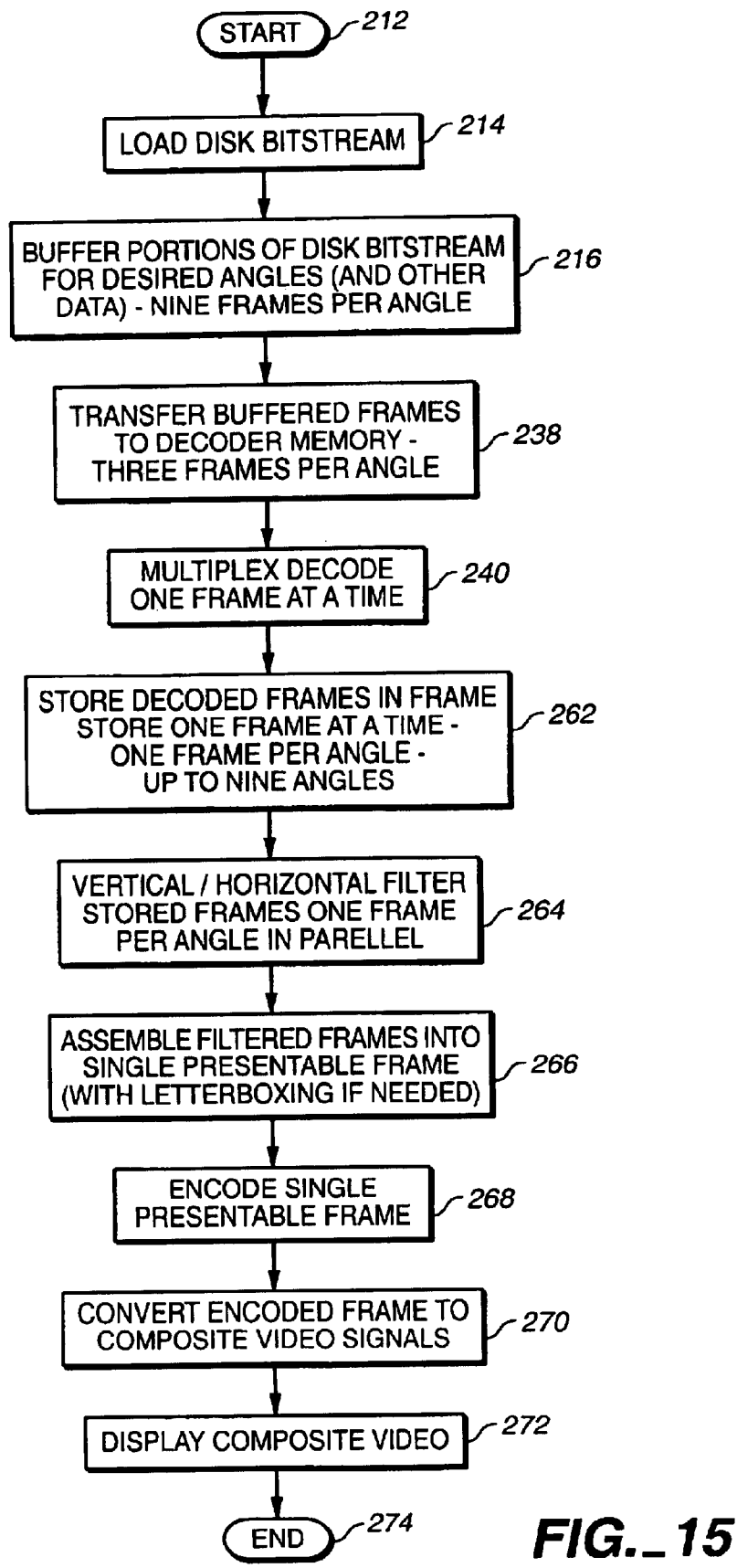
FIG._15

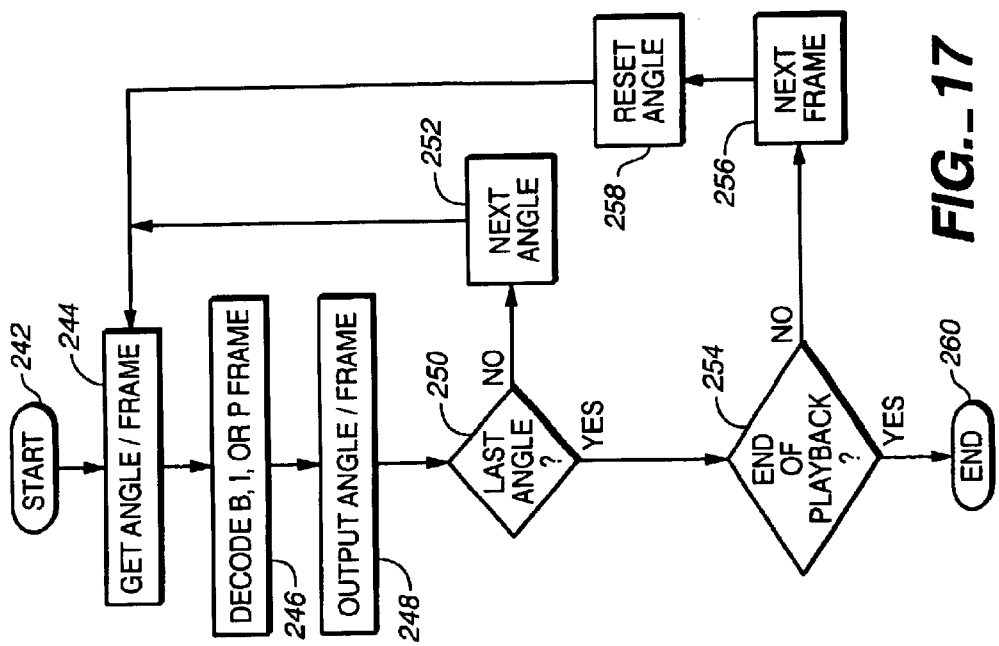
FIG._17
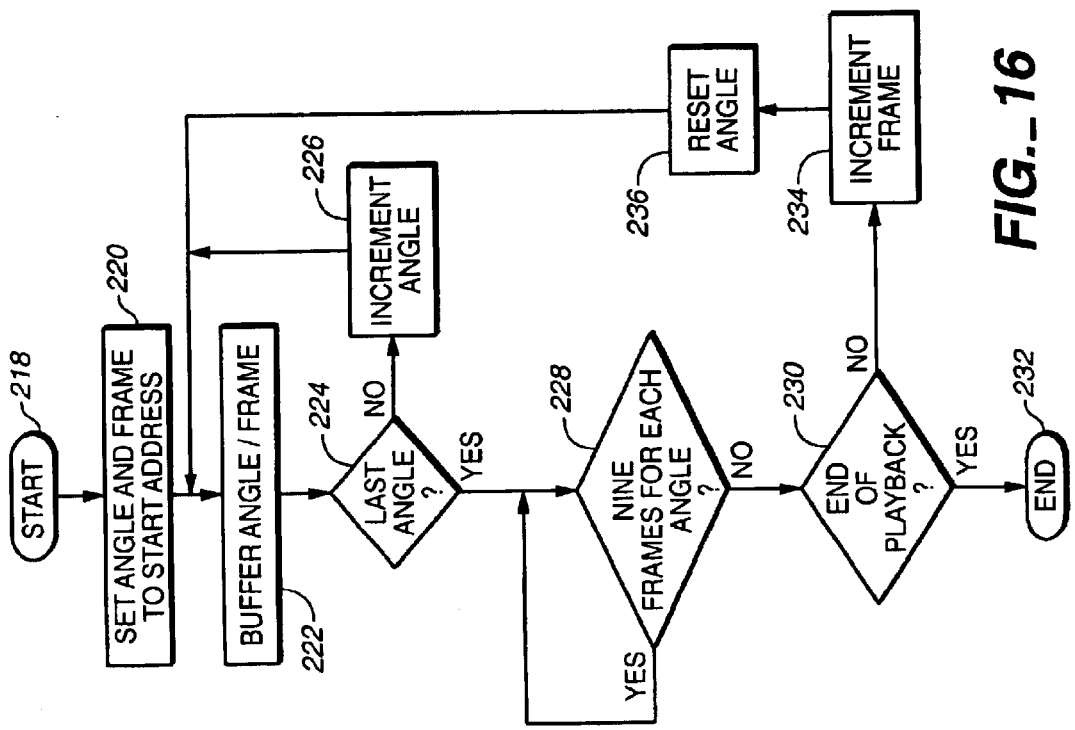
FIG._16

SIMULTANEOUS MULTIPLE-ANGLE PRESENTATION OF DVD AUDIO/VISUAL CONTENT

FIELD OF THE INVENTION

This invention relates to digital versatile disks (DVD), also known as digital video disks. More particularly, the present invention relates to the portion of the DVD formatting standard that allows for storage of multiple angles of the same video scene. A new and improved apparatus and method is provided for simultaneously displaying more than one such angle in a DVD video playback on a television or monitor.

BACKGROUND OF THE INVENTION

The digital versatile disk (DVD) standards provide for many features that were not available in previous standard video technologies, such as VHS tape and laser disc. Such additional features include the ability to allow the user to interact with the playback of DVD audio/visual (A/V) content to customize the presentation of the DVD A/V content for the user's preferences. The author of the DVD A/V content, however, must enable many of these features in the DVD A/V content for the features to be available to the user. For example, the author may choose to incorporate subtitles in DVD A/V content, and the user can choose which language, if any, in which to view the subtitles. An author may also re-film or reedit some scenes of a motion picture in different manners, such as to achieve any desired rating by the Motion Picture Association of America (e.g. NC-17, R, PG-13, PG or G). The author may then include each different version of the scenes in the DVD A/V content with formatting for "parental" control which causes the playback of the motion picture to branch between scenes so as to present only the version with the desired rating. The user may select which version or which scenes to view. A DVD A/V content author may also shoot some scenes of a motion picture from multiple angles and incorporate all of the angles, up to nine angles, in the DVD A/V content for the user to select which angle of the scene to view. Blocks of digital data for the angles are interleaved together onto the DVD disk so that the playback can branch between scenes with seamless A/V playback.

A manufacturer or developer of a DVD player, or DVD equipment in a computer, must enable each of these features in the DVD player for the user to be able to access them. In other words, the hardware, firmware and software must be present in the DVD player for the DVD player to be able to recognize the features that the author has incorporated in the DVD content and to permit the user to select from among these features. The enabling hardware, firmware and software of the DVD player must be able to decode raw bitstream data from the DVD disk for the full complement of standard DVD features to identify the particular features of the DVD content.

DVD players enabled for viewing multiple angles of video scenes provide a remote control unit (RCU) menu to use for selecting which angle to view. The RCU menu may include buttons on a physical unit and/or icons in a graphical menu displayed on a display screen. Typically, the user selects which angle to view for one or more scenes and then views the playback of the selected angle for each scene. If the user wants to view more than one angle for a given scene, then the user waits until the first angle finishes playing and then returns to the RCU menu to select and play the next angle. Only one angle at a time may be viewed, since DVD players do not have the capability to decode the raw bitstream data from the DVD disk for more than one angle at a time.

Additionally, a single audio track may be included by the author to synchronize with all of the angles, in which case the user does not select from among different audio tracks. Instead, the single audio track plays along with any selected angle. Alternatively, each angle may have its own separate audio track, in which case the user's selection of the video angle also selects the audio track for that angle.

It is with respect to these and other background considerations that the present invention has evolved.

SUMMARY OF THE INVENTION

The present invention relates to a new and improved method and apparatus for accessing DVD A/V content that permits simultaneous viewing of more than one video angle. The user selects parameters for viewing any number of angles from the available angles, up to nine. Video frames for the selected angles are scaled down in size, after being decoded, to fit into a section or fragment of the display screen, and the scaled frames are assembled into a single frame for presentation on the display screen. In addition, if more than one audio track is available for the angles, the user also selects which angle's audio track is played with the video playback. In this manner, the user does not have to stop the video playback after viewing one angle of a scene to return to the RCU menu to select the next angle to view. Rather, the user makes all angle and audio selections at once in an RCU menu and then views a side-by-side presentation of each selected angle. Alternatively, preset parameters may be selected by the user or selected automatically.

These and other improvements are achieved in a method for playing DVD content having multiple angles of video wherein frames of DVD video are decoded for each angle, and the decoded frames for each angle are simultaneously displayed in a display TV or monitor. Preferably, the display area is fragmented, and each display fragment is correlated to one of the angles, so the decoded frames for each angle are displayed in one of the display fragments. The decoded frames also are preferably filtered down to a size that corresponds to the size of the display fragments, so the filtered frames may be assembled into a single presentable frame that is viewed on the display.

The previously mentioned and other improvements are also achieved in a method of controlling playback of DVD content having multiple angles of video wherein a plurality of desired angles are selected for playback and are simultaneously displayed on a display TV or monitor. The fragmentation of the display is preferably selected so each of the desired angles is displayed in a display fragment. The correlation between the display fragments and the desired angles is also preferably selected. An audio track may also preferably be selected to accompany the playback of the video.

The previously mentioned and other improvements are also achieved in a DVD player for playing back DVD content that contains multiple angles of video. The DVD player comprises a decoder and an assembling unit. The decoder is operable to receive a bitstream for each angle and to multiplex between each angle's bitstream to decode a portion of the bitstream for each angle into frames for each angle. The assembling unit is operably connected to the decoder to receive the decoded frames for each angle and assemble the decoded frames into presentable frames that contain a frame for each angle. The presentable frames can be displayed on the display to simultaneously present the multiple angles of video.

The DVD player preferably further comprises a filter that is operably connected to the decoder and the assembling unit to receive the decoded frames for each angle and filter the decoded frames for each angle to a size corresponding to a fragment of the display. The presentable frames are, thus, assembled by placing the filtered frames into areas of the presentable frames that correspond to the display fragments, preferably without overlapping the filtered frames. The DVD player also preferably further comprises a frame store unit that is operably connected to the decoder and the filter to receive the decoded frames one at a time and provide the decoded frames to the filter in parallel.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a DVD player, RCU and alternative displays embodying the present invention.

FIG. 2 is a block diagram of a DVD-enabled computer, monitor, keyboard and pointer device embodying the present invention, in an alternative to the DVD player shown in FIG. 1.

FIG. 3 is an illustration of a DVD bitstream data structure syntax for DVD content that can be installed in the DVD player shown in FIG. 1, with certain portions expanded.

FIG. 4 is a more detailed block diagram of the DVD player shown in FIG. 1, with the display, speakers and RCU.

FIG. 5 is a more detailed block diagram of an alternative for the DVD player shown in FIG. 1, with multiple displays, a speaker and an RCU.

FIG. 6 is a general flow chart of a procedure for setting up DVD A/V content playback with multiple-angle presentation in the DVD player shown in FIG. 1

FIGS. 7–14 are exemplary menu screens with which a user interacts during the procedure shown in FIG. 6.

FIG. 15 is a general flow chart depicting the flow and processing of raw bitstream data into viewable video by the DVD player shown in FIG. 1.

FIG. 16 is a general flow chart for buffering raw bitstream data for multiple angles in the DVD player shown in FIG. 1.

FIG. 17 is a general flow chart for decoding raw bitstream data into viewable digital DVD content for multiple angles in the DVD player shown in FIG. 1.

DETAILED DESCRIPTION

A DVD player 30, with an exemplary remote control unit (RCU) 32 and two alternative examples of displays 34 and 35, is shown is FIG. 1. In a conventional DVD player, a user controls the DVD player 30 with the RCU 32 to present DVD content on the display 34 or 35. The displays 34 and 35 may be any device for displaying video, such as a standard TV or high definition TV (HDTV). Two displays 34 and 35 are shown to present two examples of simultaneous multiple-angle presentation of DVD content. Display 34 shows an example presenting two angles 36 side-by-side, and Display 35 shows an example presenting nine angles 37 in a non-overlapping 3×3 matrix. Current DVD standards permit recording of up to nine angles.

Generally, the DVD player 30 comprises a DVD disk 38 in communication with a DVD decode unit 40. The DVD disk 38 is typically a removable medium on which is stored the DVD content, but may be any type of source device for DVD content. The DVD decode unit 40 generally comprises all of the hardware, firmware and software for retrieving raw bitstream data of the DVD content from the DVD disk 38, decoding the raw bitstream data into viewable video, and sending the viewable video over a cable 41 to the display 34 or 36 for presentation. As will be described below, the DVD decode unit 40 includes the ability to form viewable video simultaneously comprising multiple angles like the two examples shown in the displays 34 and 36.

The RCU 32 is typically in communication with the DVD player 30 over an infrared (IR) link 42. The RCU 32 generally includes buttons 43 for navigating the control system of the DVD player 30. The RCU 32 may also be used to control on-screen menus, as will be described below with reference to FIGS. 7–14. Among others, the buttons 43 typically include an angles button 44, number buttons 46, cursor buttons 48, an enter button 50, a return button 52, a previous button 54 and a next button 56. The angles button 44 is typically used to enter the menus (FIGS. 7–14) for selecting angles to view. The other buttons 46, 48, 50, 52, 54 and 56 are typically used to navigate the menus (FIGS. 7–14).

A computer 58 is shown in FIG. 2 as an alternative to the DVD player 30 in FIG. 1 for presenting simultaneous multiple-angles of DVD content. Most of the description below with respect to FIGS. 3–17 will refer to the DVD player 30 shown in FIG. 1, but the description is equally applicable to the computer 58. Generally, the computer 58 is connected to a keyboard 60, a pointer device 62 (such as a mouse) and a display 64. The computer 58 is enabled for playing DVD content with an installed DVD disk and/or drive 66 in communication with a DVD decoder card 68, which generally have similar functions to the DVD disk 38 and DVD decode unit 40, respectively, shown in FIG. 1. The user typically interacts with the computer 58 through the keyboard 60 and pointer device 62 to navigate a virtual RCU (not shown, but similar to the RCU 32 in FIG. 1) on the screen of the display 64 for controlling playback of DVD content from the DVD disk 66 through the DVD decoder card 68 to the display 64.

The display 64 shows another example of simultaneous multiple-angle presentation of DVD content. In this example, five angles 70 are shown having different sizes. The user can select any number of angles for viewing, up to the total made available by the author of the DVD content, and can choose the size and arrangement for each selected angle in the available space, or display fragment, on the screen of the display 34, 35 (FIG. 1) or 64. Typically, angles are scaled to a size that is proportional to the original size of the angles, such as the dimensions of the display 64, but some angles, such as angle-4 shown in FIG. 2, may have to be trimmed to fit in a non-proportional display fragment.

A typical data structure 72 for digital data that comprises the DVD content stored on a DVD disk 38 (FIG. 1) is shown in FIG. 3. When different angles for a scene of video are available in DVD content, the angles are typically broken up into short segments or blocks arranged on the DVD disk 38 in an interleaved manner wherein the first segments for each angle are grouped together, then the second segments for each angle are grouped together, and so on. The digital data is then arranged in a hierarchy of groups or blocks. At the top of the hierarchy are video title sets (VTS) 74. A VTS 74 typically contains all of the information for a complete title, such as a motion picture or a collection of songs. There may be up to 99 VTSs on a DVD disk 38. A special case of the VTS 74 is a video manager (VMG) 76. The VMG 76 essentially contains a main menu for all of the titles available on the entire DVD disk 38. The VMG 76 and the VTSs 74 comprise the entire DVD disk 38.

Each VTS 74 comprises video title set information (VTSI) 78 and up to 99 video object sets (VOBS) 80. The VTSI 78 essentially contains header information and control data for the VTS 74 and the VOBSs 80 that follow. The DVD content for the title is divided up so that each VOBS 80 essentially contains, among other control information for video, audio and subpictures, a portion of the actual DVD content for the title. Additionally, the VOBSs 80 are usually arranged in sequential order.

Each VOBS 80 comprises one or more video objects (VOB) 82. The VOBs 82 essentially contain further subdivisions of the DVD content (video, audio, subpictures, etc.) of the title. If the author of the DVD content did not include multiple angles of scenes, however, there could potentially be one VOB 82 for the entire title. With multiple angles, though, it is necessary to divide the DVD content for each angle into short segments that can be interleaved with corresponding segments of each other angle for seamless playback. Each VOB 82 contains one short segment of one angle. For a scene shot at N angles, the VOBs 82 are arranged in groups of N VOBs 82 containing corresponding short segments of each angle. The DVD player 30 reads the raw bitstream data from the DVD disk 38 sequentially, so for seamless playback of one angle, the DVD player 30 skips over, by reading without storing as it searches for the next desired VOB 82, N-1 VOBs 82 on the DVD disk 38 to get from one VOB 82 to the next VOB 82 for the same angle. The amount of time required to skip over N-1 VOBs 82 must be short enough that the DVD player 30 does not finish playing the first VOB 82 before it can start playing the second VOB 82. When playing back multiple angles, the DVD player 30 simply reads and stores the raw bitstream data for the VOBs 82 for each selected angle.

The video objects 82 comprise one or more cells 84. A cell 84 contains a group of pictures in the video stream or group of audio blocks. Each cell 84 comprises video object units (VOBU) 86. Each VOBU 86 may contain about 0.4 to 1.0 seconds of video data or audio, subpicture or control data. Each VOBU 86 comprises packs 88, including one navigation pack (NV-PCK) 90 followed by any number of and any order of video packs (V-PCK) 92, audio packs (A-PCK) 94 and subpicture packs (SP-PCK) 96 containing video, audio and subpicture data, respectively. The packs 88 comprise packets 98 of the actual data.

A more detailed block diagram of the DVD player 30 (FIG. 1) is shown in FIG. 4. Much of the discussion below with respect tot the DVD player 30 is also applicable to the computer 58 shown in FIG. 2 as an alternative to the DVD player 30, since many, if not all, of the elements shown in the DVD player 30 in the block diagram shown in FIG. 4 are also part of the DVD decoder card 68 (FIG. 2) inserted in the computer 58. The DVD player 30 generally includes a host processor 100, a host memory RAM 102, an RCU interface 104, a host bus 106, a DVD drive 108 with the DVD disk 38 installed therein, a DVD drive interface 110, a DVD decoder 112, a frame store unit 114, a vertical and horizontal (V/H) filter unit 116, a video encoder 118 and an audio digital-to-analog converter (DAC) 120.

The host processor 100 controls the functioning of the DVD player 30 and communicates with most of the other elements of the DVD player 30 across the host bus 106, but also may have separate input/output pins or ports for communicating with some of the parts of the DVD player 30. The host bus 106 typically includes address and data lines for addressing each of the parts to which it is attached and providing command data to control these parts. The host memory RAM 102 is connected to the host bus 106 to support the operation of the host processor 100. The RCU interface 104, such as an infrared receiver, is connected to the host bus 106 and in communication with the RCU 32 for the user to access and control or set up and configure the DVD player 30 for playing back the DVD content, including with simultaneous multiple angles as desired.

The DVD drive 108 is connected to the DVD drive interface 110. The DVD drive 108 exchanges control and status signals and sends the raw bitstream data to the DVD drive interface 110. The DVD disk 38 is installed in the DVD drive 108 and contains the raw bitstream data for the DVD content in coded form.

The DVD drive interface 110 connects to the host processor 100 and the DVD decoder 112. The DVD drive interface 110 exchanges control and status signals with the host processor 100. The DVD drive interface 110 exchanges control signals with the DVD decoder 112 and sends the raw bitstream data from the DVD drive 108 to the DVD decoder 112. Under control of the host processor 100, the DVD drive interface 110 commands the DVD drive 108 to provide the raw bitstream data from the DVD disk 38, which the DVD drive interface 110 buffers and presents to the DVD decoder 112, typically in 8-bit bytes. Thus, the DVD drive interface 110 also includes a track buffer 111 for storing, or buffering, the raw bitstream data prior to sending it to the DVD decoder 112. In this manner, the DVD drive interface 110 maintains a supply of raw bitstream data for the DVD decoder 112 so that if the DVD drive 108 must branch from one part of the DVD disk 38 to another part, the DVD decoder 112 will have a sufficient supply of raw bitstream data to continue decoding the DVD content without a break in the playback during the branching. Typically, the DVD drive interface 110 maintains the track buffer 111with about nine frames of DVD content for each angle that the user has selected to view. Typically, the host processor 100 programs the DVD drive interface 110 with information needed to know which angles to buffer.

The DVD decoder 112, such as the L64020 or L64021DVD decoders available from LSI Logic, Inc., is attached to the host bus 106 for communication with and control by the host processor 100. The DVD decoder 112 receives the raw bitstream data at an input 121 and separates it into the various types of conventional DVD content, such as textual data, programming data, digital video data and digital audio data. The DVD decoder 112 also decompresses compressed DVD data into the DVD content, such as digital video data that has been compressed into the MPEG 2 (Motion Picture Experts Group) format or digital audio data that has been compressed into the Dolby Digital audio format. A decoder memory RAM 122 is connected to the DVD decoder 112 to support the functioning of the DVD decoder 112. When operating on multiple angles, the DVD decoder 112 multiplexes between receiving the raw bitstream data for each of the angles at the input 121 so as to first decode one frame of DVD content for each of the angles and then the next frame for each of the angles and so on. Typically, the DVD decoder 112 must be programmed by the host processor 100 with information to multiplex the decoding of each of the selected angles. The DVD decoder 112 typically stores three frames per angle in the decoder memory RAM 122 in order to decode the different types of frames defined by the MPEG-2 (Motion Picture Experts Group) standard in which DVD content is stored.

The frame store unit 114 is connected to the DVD decoder 112 to receive decoded frames for each of the selected angles, to the V/H filter unit 116 to provide the frames for each angle in parallel, and to the host bus 106 to exchange control and programming signals with the host processor 100. The frame store unit 114 is programmed by the host processor 100 with information to know how many angles to store. The frame store unit 114 contains sufficient memory space to store a current frame for each angle, up to the nine permitted. The frame store unit 114 essentially performs the function of a buffer or latch for presenting the frames in parallel to the V/H filter unit 116.

The V/H filter unit 116 is connected to the frame store unit 114 to receive a current frame for each angle in parallel, to the display controller 118 to provide filtered frames in parallel, and to the host bus 106 to exchange control and programming signals with the host processor 100. The V/H filter unit 116 is programmed by the host processor 100 with information regarding how many angles are to be filtered and the size to which each frame for each angle is to be filtered. The V/H filter unit 116 essentially reduces the size of each frame for each angle down to the desired size so that each angle may be viewed in the screen area available on the display 34. Filter circuitry or programs (not shown) are known for scaling images to any size. To filter the frames in parallel, one such filter circuit or program is typically present for the total number of possible angles (i.e. nine), and each filter circuit or program is connected to a corresponding space in the frame store unit 114 from which the filter circuit or program receives the frames for filtering. The V/H filter unit 116 provides the filtered frames to the display controller 118 for assembly into a single presentable frame for display on the display 34. When playing back only one angle, the frame store unit 114 and the V/H filter unit 116 act essentially as pass-through devices for the DVD content to reach the display controller 118.

The display controller 118 is connected to the V/H filter unit 116 to receive the filtered frames for each angle in parallel, to the display 34 for presenting the DVD content playback, and to the host bus 106 to exchange control and programming instructions with the host processor 100. The display controller 118 generally comprises an angle assembling unit 124, a display control 126, an on-screen display (OSD) unit 128 and a fragmentation unit 130. The display controller 118 is programmed by the host processor 100 with information regarding the number of angles to be assembled and the locations of the fragments of the display 34 into which the angles are to be assembled to form the single presentable frame. The fragmentation unit 130 receives the programming information and instructs the angle assembling unit 124 on how many angles are to be received and the fragment of the display 34 into which each angle is to be presented. The angle assembling unit 124 receives the filtered frames for each angle in parallel from the V/H filter unit 116 and assembles the single presentable frame by placing each frame into its proper fragmented section of the single presentable frame. If any part of the single presentable frame does not contain the playback of an angle, then the angle assembling unit 124 may fill the unused part with a letterboxing image.

The display control 126 receives the single presentable frame and encodes it as a display signal in either the National Television Systems Committee (NTSC) composite color-encoding system typically used in the United States or the Phase Alternate Line (PAL) composite color-encoding system typically used in Europe. The display controller 118 may also include a video DAC for converting digital video data of the single presentable frame into a composite video signal, which is output from the display controller 118 to the display 34. The OSD unit 128 receives OSD data from the host processor 100 to overlay onto the video playback and display on-screen information to the user, such as the menus that will be described with reference to FIGS. 7–14.

In an alternative to presenting multiple angles in different fragments of the display 34, the DVD player 30 can be used to enable 3-dimensional (3-D) effects in video. For 3-D video, a scene must be shot from two angles, typically with color filtering. Both angles are easily stored in the DVD multiple-angle formatting. The DVD drive interface 110, DVD decoder 112, frame store unit 114 and V/H filter unit 116 process two angles of DVD content as discussed above, except that the V/H filter unit 116 does not reduce the size of the frames of either angle. Additionally, the fragmentation unit 130 and angle assembling unit 124 in the display controller 118 are not programmed to fragment the display 34 into two display fragments and assemble filtered frames into a single presentable frame. Rather, the fragmentation unit 130 instructs the angle assembling unit 124 to alternate between reading the full-sized frames of angle-1 and angle-2 from the V/H filter unit 116 and alternatingly present the frames to the display control 126 and display 34. In this manner, with special 3-D glasses, the user can view the 3-D content. Also, it may be preferable to double the displayed frame rate to 60 frames per second, if the display can handle it, so that each angle is presented at 30 frames per second.

In another alternative, each angle may be presented on a separate display 34 as shown in FIG. 5. In this alternative, a display controller 118 (FIG. 4) with display fragmentation and angle assembly is not necessary. Instead, separate standard display controls 126 may be used to receive full-sized frames for each angle from the V/H filter unit 116, which essentially passes through the frames without filtering them. For the DVD player 30 to have the capability to operate with both a single display with multiple filtered angles and multiple displays with multiple unfiltered angles, one of the display controls 126 in FIG. 5 may be formed in the display controller 118 shown in FIG. 4 with the other display controls 126 in FIG. 5 kept separate. For presentation of multiple angles on a single display 34, the additional display controls 126 in FIG. 5 are deactivated, and the display controller 118 in FIG. 4 is programmed to fragment the display 34 and assemble filter angles. For presentation of multiple angles on multiple displays 34, however, all of the needed display controls 126 in FIG. 5 are activated, and the display controller 118 is programmed to accept only one angle with no display fragmentation. With this alternative embodiment, a fully surrounding virtual reality environment may be created in which the user is surrounded by displays on several or all sides (360° effect) and video played back simultaneously on all of the displays, not with different angles of the same scene, but with different angles shot from an individual's point of view in the center of the action.

To present the audio content accompanying the video playback on one or more speakers 132, the audio DAC 120, FIGS. 4 and 5, is connected to the DVD decoder 112 for both exchanging control signals and receiving the decoded digital audio content, to the host processor 100 for exchanging control signals, and to the speakers 132 for playing the audio content. The audio DAC 120 converts the digital audio content into an analog audio signal which can be heard on the local speakers 132.

The host processor 100 runs the software that controls the functioning of the DVD player 30. A real-time operating system (RTOS) 134 interfaces between firmware and/or hardware of the DVD player 30 and upper level applications. A navigation and presentation engine 136 performs the primary coordination functions for controlling the DVD player 30. An RCU control program 138 communicates with the navigation and presentation engine 136 and the operating system 134 to exchange communications across the host bus 106 with the RCU interface 104 to receive and process user input commands that control the DVD player 30. An OSD controller 140 communicates with the navigation and presentation engine 136 and the operating system 134 to send the OSD data to the display controller 118 to overlay video information shown on a local display with information or control menus regarding the DVD player 30 or the DVD content, including the angle menus described below.

A display control program 142 communicates with the navigation and presentation engine 136 and the operating system 134 to enable the simultaneous multiple-angle (SMA) playback. The display control program 142 receives and processes the user's inputs regarding which angles to display, how to fragment the display and which angle to place in which fragment. The display control program 142 further generates the programming and control information to enable the DVD drive interface 110, DVD decoder 112, frame store unit 114, V/H filter unit 116 and the display controller 118 to handle the simultaneous multiple-angle playback.

A general procedure for setting up parameters for the playback of simultaneous multiple angles of DVD content is shown in FIG. 6. The set-up procedure is primarily performed in the host processor 100 (FIGS. 4 and 5) with interaction by the user. The procedure starts at step 143 typically in response to the user pressing the angles button 44 (FIG. 1) on the RCU 32.

At step 144, it is determined whether the playback is for the 3-D alternative. If so, then the procedure skips down to step 200 to begin initializing the parts of the DVD player 30, since the selections to be made in the steps between step 144 and step 200, exclusive, are typically done automatically for the 3-D effect. If the determination at step 144 is negative, however, then the procedure continues at step 145 to determine whether preset or stored parameters are to be used, instead of inputting new parameters at this time. The parameters for setting up the display format for the playback of a title with multiple angles may be preset by the user or the DVD content author or stored in the host memory RAM 102 during a previous playback of the title. Therefore, the user may be presented with a menu screen (not shown) at step 145 asking the user to decide whether to use such preset or stored parameters. If so, then at step 146, the user is prompted to select from a list of preset parameters in another menu screen (not shown). Alternatively, the user may choose to have the DVD player 30 automatically make the selection from preset parameters for the particular title being played back. In another alternative, if the user does not press the angles button 44 (FIG. 1) to enter the setup procedure, then the DVD player 30 may automatically select parameters that were preset for the particular title. Once preset parameters are selected, the procedure branches to step 200 to begin initializing the parts of the DVD player 30. If the determination at step 145 was negative, then the procedure continues at step 147 to begin receiving input selections from the user.

At step 147, the user is prompted to select the number of angles to be viewed. A menu screen 148 as shown in FIG. 7 may be presented to the user through the OSD unit 128 (FIG. 4), to prompt the user to select the number of angles by pressing one of the number buttons 46 (FIG. 1). The user presses the return button 52 (FIG. 1) to continue from one step to the next (FIG. 6) after making selections in each of the menu screens (FIGS. 7–14). The user may press the previous button 54 (FIG. 1) to go backwards in the menu screens (FIGS. 7–14). Also, the user may press the next button 56 (FIG. 1) to skip a menu screen (FIGS. 71–14) or permit the DVD player 30 to automatically make some selections.

At step 150, the user is prompted to select which angles are to be viewed. A menu screen 152 as shown in FIG. 8 may be presented to the user to prompt the user to select each angle by moving between the available angles 154 using the cursor buttons 48 (FIG. 1) and highlighting each desired angle with the enter button 50 (FIG. 1). When each desired angle has been highlighted, the user presses the return button 52 (FIG. 1) to continue.

At step 156, the user is prompted to select the fragmentation of the screen of the display 34 (FIG. 1). A menu screen 158 as shown in FIG. 9 may be presented to the user to prompt the user to select a fragmentation of the display 34 into four fragments in a 2×2 matrix or nine fragments in a 3×3 matrix or some other appropriate fragmentation scheme. For the multiple-display alternative described above with reference to FIG. 5, step 156 may be skipped, since the displays 34 do not need to be fragmented.

At step 160, the user is prompted to correlate the display fragments to the selected angles. A menu screen 162 as shown in either FIG. 10 or FIG. 11 may be presented to the user for each of the selected angles to prompt the user to select (with the cursor buttons 48) and highlight (with the enter button 50) the fragment(s) to be used for the angle. FIG. 10 shows four fragments 164 available for angle-1 as would be the case if the user had selected the 2×2 fragmentation in step 156 and menu screen 158. FIG. 11, on the other hand, shows nine fragments 166 available for angle-1 as would be the case if the user had selected the 3×3 fragmentation in step 156 and menu screen 158. Additionally, the screen angles shown in the example of the display 64 in FIG. 2 may be generated by correlating angle-1, angle-2 and angle-3 (shown in FIG. 2) each to one of the fragments 166 in the top row 168 of fragments 166 shown in FIG. 11, correlating angle-4 (shown in FIG. 2) to the two lower fragments in the left column 170 of the fragments 166 shown in FIG. 11, and correlating angle-5 (shown in FIG. 2) to the four remaining fragments 166 shown in FIG. 11. For the multiple-display alternative described above with reference to FIG. 5, the selected angles may be correlated with the separate displays 34 in step 160, without any display fragmentation.

At step 172, the user is prompted to select the trimming, if any, for each of the angles. A menu screen 174 as shown in FIG. 12 may be presented to the user for each of the selected angles to prompt the user to move each corner 176 of shaded box 178 to fill the portion of the virtual display 180 to which the user wants the angle trimmed (using the cursor buttons 48 to move and the enter button 50 to lock each corner in position), thereby cutting off that portion of the angle outside the shaded box 178. FIG. 13 shows examples of ways in which the user may choose to trim the angles. Example 182 shows the selection of a center portion of the display 34 (FIG. 1). Example 184 shows the selection of a top left portion of the display 34 (FIG. 1). Example 186 shows the selection of a c enter vertical portion of the display 34 (FIG. 1). Example 188 shows the selection of a left vertical portion of the display 34 (FIG. 1). Example 190 shows the selection of a center horizontal portion of the display 34 (FIG. 1). Example 192 shows the selection of a bottom horizontal portion of the display 34 (FIG. 1). Angle-4 shown in display 64 as shown in FIG. 2 would probably be trimmed to a vertical column, such as in the examples 186 or 188, in order to fit in a display fragment that is not proportional to the total display 64. Skipping step 172 and menu screen 174 by pressing the next button 56 may default the shaded box 178 to the entire virtual display 180, essentially selecting no trimming.

At step 194, the user is prompted to select the audio source for the DVD content playback if more than one audio track is available, such as one per angle. A menu screen 196 as shown in FIG. 14 may be presented to the user to prompt the user to select the audio track for one of the selected angles 198.

In the following steps, the user input information collected above is used to program or initialize the parts of the DVD player 30 shown in FIG. 4 or FIG. 5. The track buffer 111 in the DVD drive interface 110 (FIG. 4 or 5) is initialized in step 200. The DVD drive interface 110 (FIG. 4 or 5) is programmed with the number of angles and the selected angles to be viewed, so that it knows which VOBs 82 (FIG. 3) from which to read and buffer the raw bitstream data for the selected angles and so that it properly allocates sufficient space in the track buffer 111 for the number of frames to be buffered for all of the angles. The DVD decoder 112 (FIG. 4 or 5) is initialized in step 202. The DVD decoder 112 (FIG. 4 or 5) is programmed with the number of angles to be decoded so that it will know how much space to reserve for the frames for each angle in the decoder memory RAM 122 (FIG. 4 or 5) and so that the DVD decoder 112 (FIG. 4 or 5) knows how to multiplex between the frames of the different angles that it is decoding. The frame store unit 114 (FIG. 4 or 5) is organized in step 204 so that memory in the frame store unit 114 is allocated for the proper number of angles. The V/H filter unit 116 (FIG. 4 or 5) is initialized in step 206 so that the proper number of filter circuits or programs (not shown) will be activated to receive and filter the frames from the corresponding allocated memory space in the frame store unit 114. The display controller 118 (FIG. 4), or the display controls 126 (FIG. 5), is initialized in step 208. The display controller 118 (FIG. 4) is programmed with the number of angles, the fragmentation of the display 34 and the correlation between the selected angles and the display fragments. The display controls 126 (FIG. 5) for each selected angle just need to be activated for the multiple-display alternative. The procedure ends in step 210.

The flow and processing of any portion of the DVD content through the DVD player 30 from raw bitstream data to viewable video with multiple angles on a single display is illustrated in the flow chart shown in FIG. 15. The flow of any portion of the DVD content starts at step 212. The raw bitstream data is loaded in step 214 by reading the raw bitstream data from the DVD disk 38 (FIG. 4) and sending it to the DVD drive interface 110 (FIG. 4), where the DVD drive interface 110, in step 216, buffers the raw bitstream data for the frames for each selected angle in the track buffer 111. The DVD drive interface 110 (FIG. 4) also buffers any other raw bitstream data, such as control and programming information, needed for playback the DVD content.

FIG. 16 shows a general flowchart for a buffering routine for buffering the frames for each angle which occurs at step 216 in FIG. 15. The buffering routine starts at step 218. The angle and frame at which the raw bitstream data is to begin to be buffered is set in step 220. At step 222, the current frame for the current angle is buffered. At step 224, it is determined whether the current angle is the last angle in the sequence of desired angles. If not, then the current angle is incremented in step 226 to the next angle, and the routine branches back to step 222, so the current frame for the next angle is also buffered. Once the current frame for each angle has been buffered (i.e. step 224 determines that the last angle has been reached), it is determined in step 228 whether the track buffer 111 currently holds the maximum number (e.g. nine) of buffered frames for each angle. If so, then the routine loops back to step 228 until at least one of the buffered frames for each angle has been removed or transferred to the DVD decoder 112. Once the determination in step 228 is negative, it is determined in step 230 whether the DVD player 30 has reached the end of the playback, so the buffering routine can end in step 232. As long as the determination in step 230 is positive, however, the current frame is incremented in step 234 to the next frame for each angle, the current angle is reset to the first one of the selected angles in step 236, and the routine branches back to step 222 to begin buffering the next frames for each of the selected angles.

Buffered frames are transferred at step 238 shown in FIG. 15 to the decoder memory RAM 122. Three frames for each angle are maintained in the decoder memory RAM 122 at any time. The frames are decoded in step 240 in a multiplexed manner one frame at a time.

FIG. 17 shows a general flowchart for a multiplexed decoding routine for decoding the frames for each angle. The decoding routine starts at step 242. The current frame for the current angle is retrieved in step 244. At step 246, the current frame is decoded using data from just the current frame, or from the current and previous frames or from the current plus previous and next frames, depending on whether the current frame is an I Frame, P Frame or B Frame, respectively. An I Frame is a picture that is encoded independent from other pictures. A P Frame encodes only the difference from the previous frame. A B Frame encodes differences based on both the previous and following frames. The decoded frame for the current angle is output to the frame store unit 114 (FIG. 4) at step 248. At step 250, it is determined whether the current angle is the last one of the selected angles. If not, then the current angle is incremented to the next angle in step 252, and the routine branches back to step 244, so the current frame for the next angle can be retrieved and decoded. Once the last angle for the current frame has been reached (i.e. the determination in step 250 is positive), it is determined in step 254 whether the end of the playback has been reached. If not, then the current frame is incremented to the next frame (step 256), the current angle is reset to the first angle of the selected angles (step 258), and the routine branches back to step 244 to begin decoding the next frames for each of the angles. Once the DVD player 30 has reached the end of the playback (i.e. the determination in step 254 is positive), the routine for multiplexed decoding ends in step 260.

Decoded frames are stored at step 262 shown in FIG. 15 in the frame store unit 114 (FIG. 4). One frame per angle for up to nine angles are maintained in the frame store unit 114. The stored frames are V/H filtered in parallel in the V/H filter unit 116 (FIG. 4) in step 264 to the scaled size for the corresponding fragment of the display 34 (FIG. 4). The filtered frames are assembled in the angle assembling unit 124 (FIG. 4) into a single presentable frame, with letterboxing if needed, in step 266. The single presentable frame is encoded according to either the NTSC or PAL composite color-encoding system in step 268. The encoded frame is converted into the composite video signals in step 270 for presentation on the display 34 (FIG. 4) in step 272. The flow of the DVD content ends in step 274.

The invention has the advantage of permitting the user to view all of the desired angles of DVD content at the same time, rather than one at a time. Thus the user is saved from the annoying task of having to stop the video playback, reselect the angle and restart the playback with the new angle. The user is better assured of not missing an important part of the playback simply because it was too inconvenient to play back all of the available angles individually. Additionally, an existing DVD formatting feature, the ability to provide multiple angles, is more useful to content authors and users, alike, since the invention makes it considerably easier to exploit the feature.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

What is claimed is:

1. A method of playing DVD content having multiple angles of video comprising the steps of:
   decoding frames of DVD video for a selected plurality of the multiple angles; and
   simultaneously playing back the DVD video content of the selected plurality of the multiple angles by simultaneously displaying the decoded frames of each of the selected plurality of the multiple angles in a single display.

2. A method as defined in claim 1 further comprising the steps of:
   fragmenting the display into display fragments; and
   correlating each display fragment to one of the angles; and wherein:
      the displaying step further comprises displaying the decoded frames for each angle in the correlated display fragments.

3. A method as defined in claim 1 further comprising the step of:
   filtering the decoded frames to a size corresponding to one of a plurality of fragments of the display; and wherein:
      the displaying step further comprises simultaneously displaying the filtered frames in the display.

4. A method as defined in claim 3 wherein the filtering step further comprises filtering frames for each angle in parallel.

5. A method as defined in claim 3 further comprising the step of:
   assembling the filtered frames into presentable frames containing one filtered frame for each angle.

6. A method as defined in claim 5 wherein the presentable frames contain the filtered frames in locations on the display corresponding to the fragments of the display.

7. A method as defined in claim 3 wherein the fragments of the display comprise separate non-overlapping portions of the display.

8. A method as defined in claim 1 wherein the decoding step decodes one frame at a time and multiplexes between frames for each angle.

9. A method as defined in claim 1 further comprising the step of:
   loading a DVD bitstream comprising data for the multiple angles of video; and wherein:
      the decoding step decodes the frames from the DVD bitstream.

10. A method as defined in claim 1 wherein:
    the displaying step displays decoded frames in a plurality of displays.

11. A method of controlling playback of DVD content having multiple angles of video, the playback being for presentation on a display, comprising the steps of:
    providing multiple angles of video capable of being played back on the display;
    selecting a plurality of desired angles from the multiple angles; and
    simultaneously playing back the desired angles on the display.

12. A method as defined in claim 11 further comprising the steps of:
    selecting a number of fragments of the display from one to nine fragments;
    fragmenting the display into the selected number of display fragments; and wherein:
       the playing back step displays the desired angles with each desired angle in a display fragment.

13. A method as defined in claim 12 further comprising the step of:
    selecting a correlation between the display fragments and the desired angles; and wherein:
       the playing back step displays each desired angle in its correlated display fragment.

14. A method as defined in claim 11 further comprising the step of:
    trimming the display size of an angle of video to display only a portion of the angle on the display.

15. A method as defined in claim 11, wherein the DVD content has multiple audio tracks, further comprising the steps of:
    selecting an audio track to accompany the playing back the desired angles; and
    playing the selected audio track simultaneously with playing back the desired angles on the display.

16. A DVD player for playing DVD content on a display, the DVD content containing multiple angles of video of a single scene, the DVD player comprising:
    a decoder comprising an input which receives a bitstream for each one of the multiple angles in a multiplexed manner, the bitstream representing the DVD content for each one of the multiple angles, and the decoder decoding a portion of the bitstream for each angle into frames for each angle on a continuing basis for simultaneous seamless playback of each angle; and
    a display controller connected to the decoder and the display, and operative to receive the decoded frames from the decoder, to convert the decoded frames into a display signal containing information describing multiple simultaneous angles of a single scene, and to send the display signal to the display for use by the display in displaying multiple simultaneous angles of the scene.

17. A DVD player as defined in claim 16 further comprising:
    an assembling unit connected to the decoder and the display controller, and operative to receive the decoded frames for each angle from the decoder, to assemble the decoded frames into presentable frames containing a frame for each angle, and to send the presentable frames to the display controller; and wherein:

the display controller is operative to convert the presentable frames into the display signal to simultaneously present the multiple angles of video on the display.

18. A DVD player as defined in claim 16 further comprising:

a filter connected to the decoder and the assembling unit, and operative to receive the decoded frames for each angle and to filter the decoded frames for each angle to a size corresponding to a fragment of the display; and wherein:

the assembling unit assembles the filtered frames into the presentable frames.

19. A DVD player as defined in claim 18 further comprising:

a frame store unit connected to the decoder and the filter, and operative to receive the decoded frames one at a time and to provide the decoded frames to the filter in parallel.

20. A DVD player as defined in claim 17 wherein the presentable frames contain the decoded frames in spaces corresponding to non-overlapping fragments of the display, each angle being correlated to one non-overlapping fragment.

21. A DVD player as defined in claim 18 wherein the filter is operative to filter one frame per angle for all of the angles in parallel.

22. A DVD player as defined in claim 16 further comprising:

a control unit comprising buttons with which a user can select desired angles to be viewed from among the multiple angles.

23. A DVD player as defined in claim 16 further comprising:

a plurality of display controllers connected to the decoder and corresponding to a plurality of displays, and operative to receive the decoded frames and present the decoded frames on the plurality of displays.

* * * * *